(12) United States Patent
Bakker

(10) Patent No.: US 8,739,663 B2
(45) Date of Patent: Jun. 3, 2014

(54) DEVICE FOR HOLDING AN ANCILLARY DEVICE AT RIGHT ANGLES TO AN IMAGINARY AXIS OF ROTATION

(76) Inventor: Joannes Hendricus Bakker, Son en Breugel (NL)

(*) Notice: Subject to any disclaimer, the term of this patent is extended or adjusted under 35 U.S.C. 154(b) by 201 days.

(21) Appl. No.: 13/513,810

(22) PCT Filed: Dec. 2, 2010

(86) PCT No.: PCT/NL2010/050812
§ 371 (c)(1), (2), (4) Date: Jul. 9, 2012

(87) PCT Pub. No.: WO2011/068406
PCT Pub. Date: Jun. 9, 2011

(65) Prior Publication Data
US 2012/0272797 A1    Nov. 1, 2012

(30) Foreign Application Priority Data

Dec. 3, 2009 (NL) .................................. 2003902
Jun. 11, 2010 (NL) .................................. 2004879

(51) Int. Cl.
*B23B 5/00* (2006.01)
*B23B 5/04* (2006.01)

(52) U.S. Cl.
USPC .............................. 82/112; 82/128

(58) Field of Classification Search
USPC ........... 82/112, 128, 151, 152, 153, 157, 162, 82/167
See application file for complete search history.

(56) References Cited

U.S. PATENT DOCUMENTS

| | | | | |
|---|---|---|---|---|
| 3,813,970 A * | 6/1974 | Mitchell | | 82/158 |
| 3,871,066 A * | 3/1975 | Mitchell | | 29/560 |
| 4,226,146 A * | 10/1980 | Ekman | | 82/112 |
| 6,619,163 B2 * | 9/2003 | Tanio et al. | | 82/112 |
| 7,640,832 B2 * | 1/2010 | Gerdes et al. | | 82/1.11 |
| 2002/0066341 A1 * | 6/2002 | Greenwald et al. | | 82/112 |
| 2002/0112575 A1 * | 8/2002 | Carpenter et al. | | 82/112 |
| 2005/0016338 A1 | 1/2005 | Gerdes et al. | | |
| 2009/0301273 A1 * | 12/2009 | Bloom et al. | | 82/112 |

FOREIGN PATENT DOCUMENTS

NL   2002215      5/2009
WO   WO 2007049958  5/2007

* cited by examiner

*Primary Examiner* — Will Fridie, Jr.
(74) *Attorney, Agent, or Firm* — Eric Karich

(57) ABSTRACT

A device for holding a tool holder for face milling a brake disc present on a vehicle has a coupling section which can be connected to a shaft or hub rotating around the axis of rotation, as well as a support for supporting the ancillary device, and holding the ancillary device at right angles to the axis of rotation. The holder comprises a hinge construction, a first part of which having a sphere function and the second part of which having a scale function, one of the parts being connected to the coupling section and the other part being connected to the support.

12 Claims, 2 Drawing Sheets

DEVICE FOR HOLDING AN ANCILLARY DEVICE AT RIGHT ANGLES TO AN IMAGINARY AXIS OF ROTATION

CROSS-REFERENCE TO RELATED APPLICATIONS

This application for a utility patent is a continuation of a previously filed utility patent, now abandoned, having the application number PCT/NL2010/050812, filed Dec. 2, 2010 (Publication No. WO 2011/068406).

BACKGROUND OF THE INVENTION

1. Field of the Invention

The invention relates to a device for holding an ancillary device at right angles to an imaginary axis of rotation, more particularly a tool holder for face milling a brake disc present on a vehicle.

The device comprises a coupling section which can be connected to a shaft or hub rotating around the axis of rotation, as well as a support for supporting the ancillary device, and means for holding the ancillary device at right angles to the axis of rotation, which holding means comprise a hinge construction according to the spherical hinge principle which comprises two parts, a first part of which having a sphere function and the second part of which having a scale function, one of the parts being connected to the coupling section and the other part being connected to the support, the device further including adjusting means for adjusting the support at right angles to the axis of rotation, which adjusting means during the rotating of the coupling section can tilt the support in a time-continuous manner around two tilting axes which are arranged at an angle to each other through the centre of an imaginary sphere through the contact faces of the first and second parts, and the adjusting means comprising operating means which are substantially stationary relative to the firm object, and comprising turning means for turning the support relative to the coupling section around an imaginary rotary shaft at right angles to the imaginary axis of rotation, the turning means resting against the support and the coupling section. The imaginary axis of rotation may then be a real shaft to which is attached for example a brake disc or another object, or may be an imaginary centre line of a hub to which a brake disc or other object is attached.

Holding the support (and adjusting the support) at right angles, for example a milling machine, is necessary because for example the coupling section may wobble relative to the hub (the imaginary axis of rotation) during rotation as a result of flaws in the coupling between the hub and the coupling section.

2. State of the Art

A device of this type is known from WO-A-2007/049958. The wobbling effect of the support relative to the coupling section is measured herein by a dial gauge. As soon as the hand of the dial gauge no longer moves during the adjusting operation, the support will no longer wobble relative to the coupling section and the desired position will have been obtained. A disadvantage of this known device is that installing the dial gauge is often an awkward job and that it is hard to install the dial gauge in a stable manner.

SUMMARY OF THE INVENTION

It is an object of the invention to provide a device of the type defined in the opening paragraph which can be adjusted in a simpler manner. For this purpose the device according to the invention is characterised in that the device further includes a protractor which is attached to the support and produces a signal that is indicative of the orientation of the support relative to an imaginary horizontal face. As soon as the signal from the protractor no longer changes during the adjusting operation, the setting of the support relative to the coupling section will no longer change during rotation of the coupling section. The position of the support relative to the coupling section may change it is true, but not the setting, or worded differently, the orientation. The protractor can be attached to or to the bottom of the support in a simple manner.

An embodiment of the device according to the invention is characterised in that the device further includes driving means for the turning means as well as a control unit which is coupled to the driving means and the protractor and which controls the driving means until the signal of the protractor no longer changes.

A further embodiment of the device according to the invention is characterised in that the turning means, for turning the support and the coupling section relative to each other, comprise two driving elements for locally forcing the support and the coupling section to be apart against a spring force, as well as displacing means for displacing the driving elements in axial direction relative to the support and the coupling section.

It should be observed that this embodiment of the turning means may also be applied to a device of the type defined in the opening paragraph, which does not include a protractor.

In that case the driving elements are spline-shaped and/or de support and/or the coupling section are provided with a conical face as a result of which the parts are moved away from each other if the drive element is forced between them.

The imaginary connecting lines between the driving elements and the imaginary axis of rotation are preferably inclined at an angle between 45 and 135 degrees relative to each other.

The driving elements are preferably formed by small carts which have at least one wheel at the bottom and which can be moved over a conical face on the support or the coupling section. The small carts can then preferably be moved with a top side along rollers.

In again a further embodiment the displacing means are formed by screw spindles cooperating with nuts which are coupled to the driving elements.

Furthermore, preferably on the side of the coupling section present opposite the driving elements, a hold-down spring is present between the coupling section and the support.

The operating means preferably comprise two turning knobs. Since the support and the coupling section are re-adjusted relative to each other, and not the support relative to the firm object as is known from the prior art device, no part of the firm object is needed in the neighborhood of the device.

A further embodiment of the device according to the invention is characterised in that the means for turning the support and the coupling section relative to each other comprise two forks each comprising a tilting element which at one extremity ends in two arms, which arms with the free extremities are hingeably connected to rings which can be displaced in axial direction by the operating means, the tilting element being closed in between two component parts and tilting between these two component parts as a result of a displacement of the free extremities of the arms of the fork and the tilting element thereby pushing these component parts apart or enabling these component parts to be brought together, for example by means of a spring, where one of these component parts is connected to the coupling section and the other component part is connected to the support and where the support turns around the hinge construction relative to the coupling section as a result of the tilting action.

Yet a further embodiment of the device according to the invention is characterised in that the first part of the hinge construction is connected to the support and the second part of the hinge construction is connected to the coupling section.

In this context it should be observed that a spherical hinge in which the first part having a spherical function is connected to the support and the second part having a scale function is connected to the coupling section can also be applied to a device of the type as defined in the opening paragraph without any adjusting means or at any rate without the adjusting means specifically described here. In the prior art device the first part is connected to the coupling section and the second part is connected to the support. It is obvious to embody the device in this manner and it seems illogic to do this differently. However, it has turned out that it may be advantageous to alternate the parts. This is particularly the case if the support is to rest against the coupling section when the support is turned relative to the coupling section.

The first part is preferably formed here by an annular spherical disc and the second part is preferably formed here by a ring having an inside congruent with the spherical disc.

BRIEF DESCRIPTION OF THE DRAWINGS

The following description relating to the appended drawings, the whole given by way of non-limiting example of the device according to the invention, will provide better understanding of how the invention can be realised, in which.

DETAILED DESCRIPTION OF THE DRAWINGS

Figure 1:
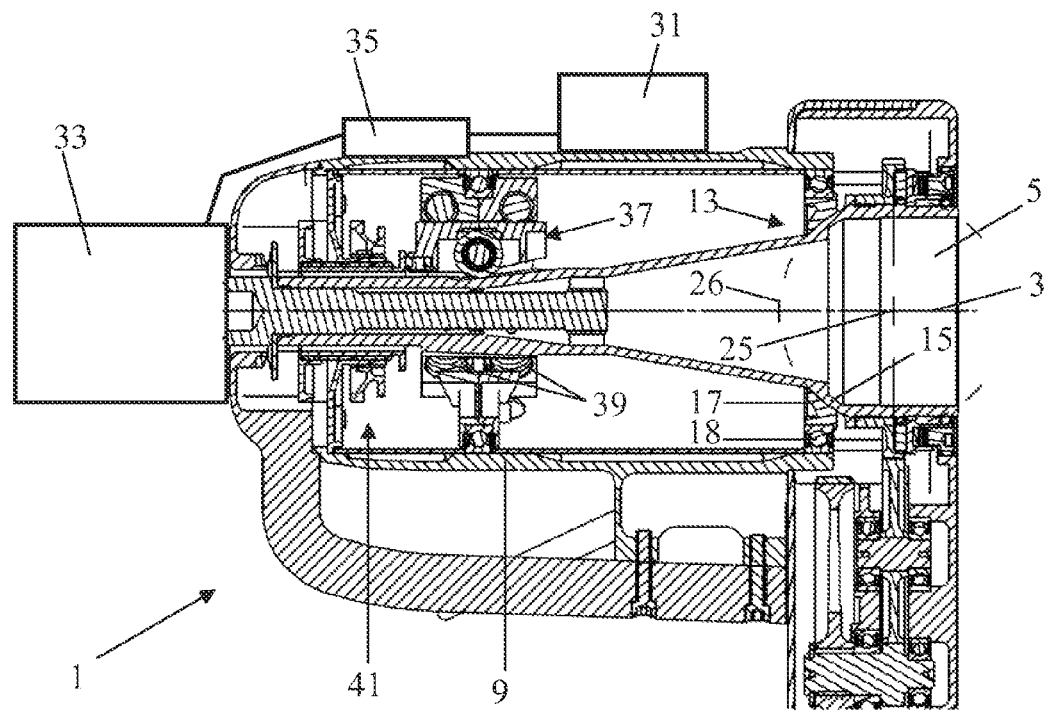
FIG. 1 shows a longitudinal section of an embodiment of the device according to the invention.

The Figures show an embodiment of the device according to the invention in various longitudinal and cross sections. In this embodiment the device is arranged as a device 1 for holding an ancillary device at right angles to an imaginary axis of rotation 3 of a brake disc. The brake disc is present here on a hub that forms part of a vehicle and thus need not be dismounted from the vehicle so as to be processed. This ancillary device is formed by a holder for a milling machine for face milling the brake disc and is attached to a support 9 which forms part of the device.

The device further includes a coupling section 5 which can be detachably connected to the hub and includes a holder, such as a means for holding the support 9 at right angles to the axis of rotation 3. These means are provided with a hinge construction 13 according to the spherical hinge principle. This hinge construction has two parts 15, 17 of which a first part 15 has a spherical function and is connected to the coupling section 5 and the second part 17 has a scale function and is connected to the support 9 by means of a ball bearing 18. The first part 15 is then formed by an annular spherical disc and the second part 17 is formed by a ring having an inside congruent with the spherical disc. The coupling section 5 is formed by a hollow sleeve of which a section has a conical shape.

Figures 4, 5:
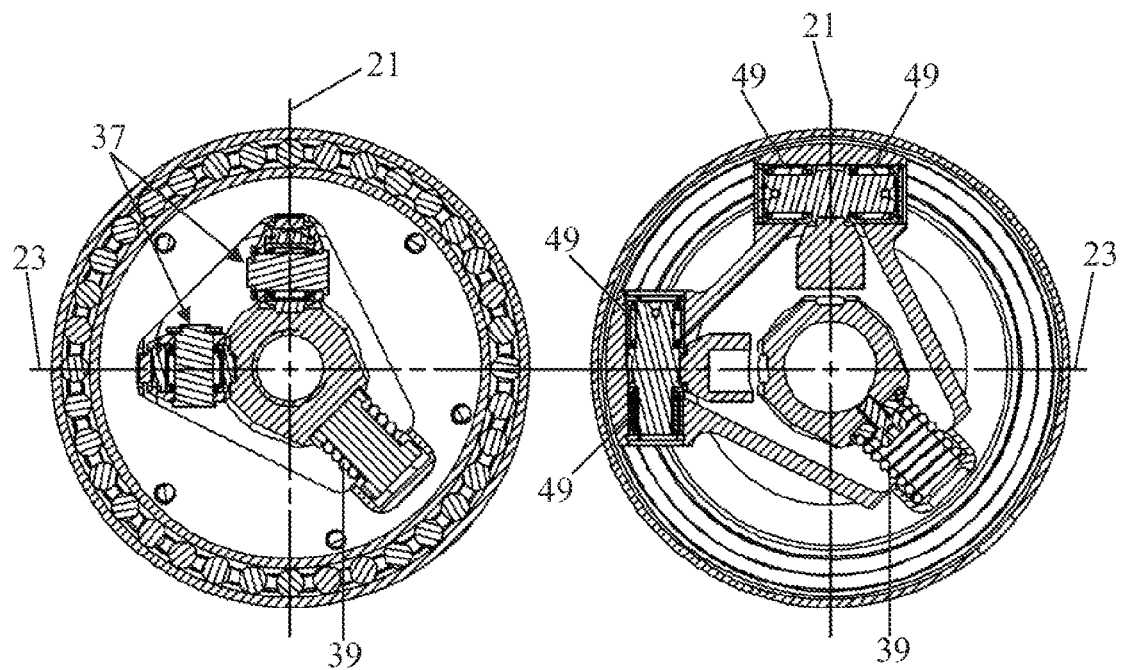
FIG. 4 shows a cross section of the internal parts of the device.
FIG. 5 shows a cross section of the internal parts of the device.

The device comprises an adjusting mechanism, such as an adjusting means for turning the support 9 relative to the coupling section 5. These adjusting means can tilt the support in a time-continuous manner during rotation around two tilting axes 21 and 23 which are arranged at an angle to each other (see FIGS. 4 and 5) through the centre 25 of an imaginary sphere 26 through the contact faces of the first and second parts 15, 17 (see FIG. 1). The adjusting means comprise an operating element, such as an operating means 27 which are substantially stationary relative to the firm object (the vehicle and the surroundings (floor, garage) where the vehicle is located). The adjusting means further comprise turning means 29 for turning the support 9 and the coupling section 5 relative to each other. During the turning action of the support relative to the coupling section these turning means 29 rest against the support 9 and the coupling section 5 and not against the firm object.

The device 1 further includes a protractor 31 which is installed on top of the support 9 and transmits a signal that is indicative of the orientation of the support relative to an imaginary horizontal face.

The device further includes driving means for driving the turning means. These driving means are formed by two electromotors 33. The protractor 31 and the two electromotors 33 are coupled to a regulating unit 35 which regulates the electromotors until the signal from the protractor 31 no longer changes.

Figure 2:
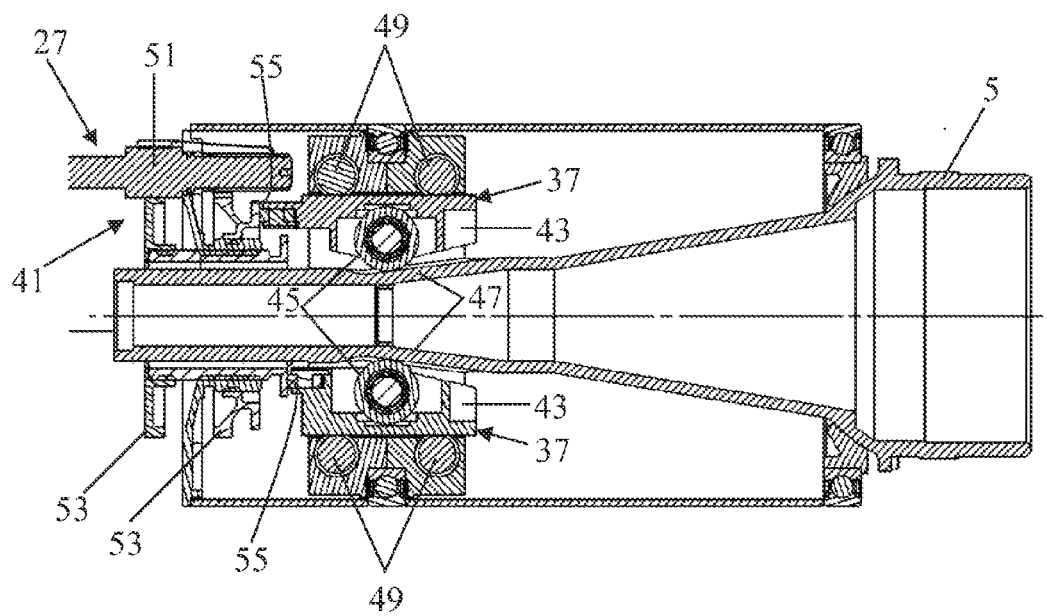
FIG. 2 shows another longitudinal section of the internal parts of the device.
Figure 3:
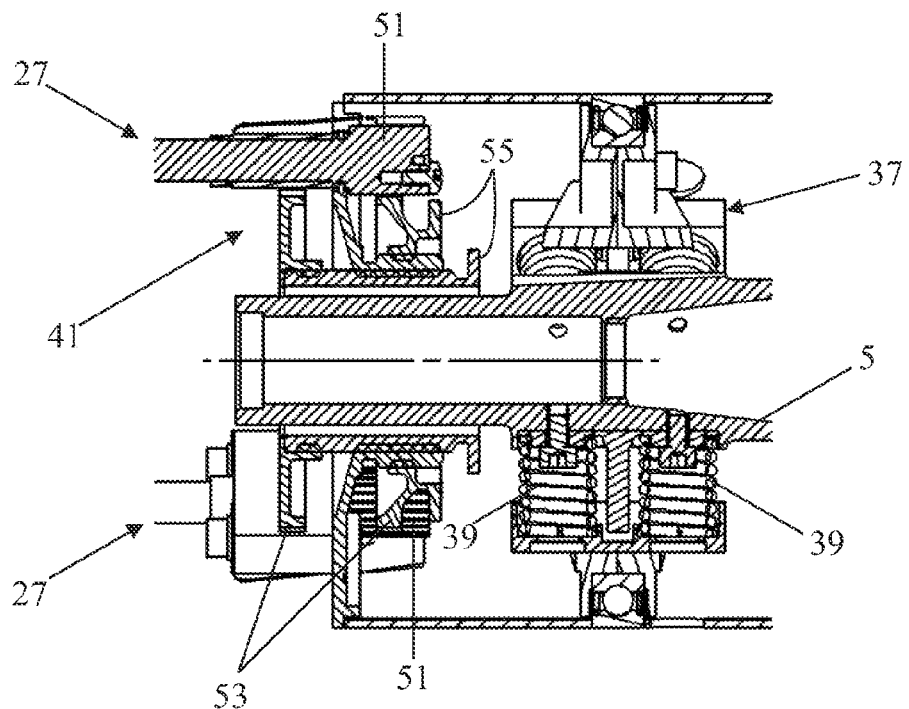
FIG. 3 shows yet another longitudinal section of the internal parts of the device.

The turning means comprise two driving elements 37 with the imaginary connecting lines between the driving elements and the imaginary axis of rotation are situated at a 90 degree angle relative to each other (in FIG. 2 the top and bottom half are longitudinal sections which are present at a 90 degree angle relative to each other). The driving elements can locally push the support and the coupling section away from each other against a spring force (which is produced by hold-down springs 39). The turning means further include displacing means 41 for displacing the driving elements in axial direction relative to the support and the coupling section.

The driving elements 37 are formed by small carts 43 which have at least one wheel 45 at the bottom which can be moved over a conical face 47 on the coupling section 5. The carts can be moved with a top side along rollers 49.

The displacing means 41 are formed by screw spindles 51 which are connected to the electromotors 33 and which cooperate with nuts 53 which have pressure faces 55 pushing against the driving elements 37.

The hold-down springs 39 on the coupling section 5 side opposite the driving elements 37 are a hold-down spring between the coupling section and the support 9.

Albeit the invention has been described in the foregoing with reference to the drawings, it should be pointed out that the invention is not by any manner or means restricted to the embodiment shown in the drawings. The invention also extends over any embodiment deviating from the embodiment shown in the drawings within the spirit and scope defined by the claims.

The invention claimed is:

1. A device for holding an ancillary device at right angles to an imaginary axis of rotation, more particularly a tool holder for face milling a brake disc present on a vehicle, the device comprising:

a coupling section which can be connected to a shaft or hub rotating around the axis of rotation, as well as a support for supporting the ancillary device, and means for holding the ancillary device at right angles to the axis of rotation, which holding means comprise a hinge construction according to the spherical hinge principle which comprises two parts, a first part of which having a sphere function and the second part of which having a scale function, one of the parts being connected to the coupling section and the other part being connected to the support, the device further including adjusting means for adjusting the support at right angles to the axis of rotation, which adjusting means during the rotating of the coupling section can tilt the support in a time-continuous manner around two tilting axes which are arranged at an angle to each other through a centre of an imaginary sphere through the contact faces of the first and second parts, and the adjusting means comprising operating means which are substantially stationary relative to the firm object, and comprising turning means for turning the support relative to the coupling section around an imaginary rotary shaft at right angles to the imaginary axis of rotation, the turning means resting against the support and the coupling section, characterised in that the device further includes a protractor which is attached to the support and produces a signal that is indicative of the orientation of the support relative to an imaginary horizontal face.

2. A device as claimed in claim 1, characterised in that the device further includes driving means for the turning means as well as a control unit which is coupled to the driving means and the protractor and which controls the driving means until the signal of the protractor no longer changes.

3. A device as claimed in claim 2, characterised in that the turning means, for turning the support and the coupling section relative to each other, comprise two driving elements for locally forcing the support and the coupling section to be apart against a spring force, as well as displacement means for displacing the driving elements in axial direction relative to the support and the coupling section.

4. A device as claimed in claim 3, characterised in that the imaginary connecting lines between the driving elements and the imaginary axis of rotation are inclined at an angle between 45 and 135 degrees relative to each other.

5. A device as claimed in claim 3, characterised in that the driving elements are formed by small carts which have at least one wheel at the bottom and which can be moved over a conical face on the support or the coupling section.

6. A device as claimed in claim 5, characterised in that the small carts with a top side can be moved along rollers.

7. A device as claimed in claim 2, characterised in that the displacing means are formed by screw spindles cooperating with nuts which are coupled to the driving elements.

8. A device as claimed in claim 2, characterised in that on the side of the coupling section present opposite the driving elements, a hold-down spring is present between the coupling section and the support.

9. A device as claimed in claim 2, characterised in that the operating means comprise two turning knobs.

10. A device as claimed in claim 2, characterised in that the first part of the hinge construction is connected to the support and the second part of the hinge construction is connected to the coupling section.

11. A device as claimed in claim 10, characterised in that the first part is formed by an annular spherical disc and the second part is formed by a ring having an inside congruent with the spherical disc.

12. A device for holding a tool holder at a right angle to an axis of rotation for face milling a brake disc on a vehicle, the device comprising:
   a coupling section which can be connected to a shaft or hub rotating around the axis of rotation;
   a support for supporting the brake disc, and holder for holding the brake disc at right angles to the axis of rotation, which holder comprises a hinge construction according to the spherical hinge principle which comprises two parts, a first part having a sphere function and a second part having a scale function, one of the two parts being connected to the coupling section and the other of the two parts being connected to the support;
   an adjusting mechanism for adjusting the support at right angles to the axis of rotation, the adjusting mechanism being capable of, during the rotating of the coupling section, tilting the support in a time-continuous manner around two tilting axes which are arranged at an angle to each other through a centre of an imaginary sphere through the contact faces of the first and second parts
   an operating element of the adjusting mechanism which is substantially stationary relative to the brake disc;
   a turning element for turning the support relative to the coupling section around an imaginary rotary shaft at right angles to the imaginary axis of rotation, the turning element resting against the support and the coupling section; and
   a protractor attached to the support which produces a signal that is indicative of the orientation of the support relative to an imaginary horizontal face.

* * * * *